United States Patent [19]

Wolfson et al.

[11] Patent Number: 4,580,705
[45] Date of Patent: Apr. 8, 1986

[54] CONVEYOR HANGER WITH ROTATING GATE GRIPPER

[75] Inventors: Lawrence S. Wolfson, West Hartford, Conn.; David Vickers, Worsley, England

[73] Assignee: Gerber Garment Technology, Inc., South Windsor, Conn.

[21] Appl. No.: 651,426

[22] Filed: Sep. 17, 1984

[51] Int. Cl.⁴ ........................................... A41D 27/22
[52] U.S. Cl. .................................................... 223/85
[58] Field of Search ................. 211/119, 51, 113, 118, 211/181, 115, 116, 164, 165, 170; 198/678; 223/85, 95, 96, 88

[56] References Cited

U.S. PATENT DOCUMENTS

| | | | |
|---|---|---|---|
| 205,106 | 6/1878 | Largent | 211/124 |
| 737,252 | 8/1903 | Leimberger | 211/119 |
| 794,176 | 7/1905 | Hamilton | 211/113 |
| 797,566 | 8/1905 | Ellis | 211/181 |
| 864,114 | 8/1907 | Wheary | 211/113 |
| 956,501 | 4/1910 | Oichman | 211/113 |
| 1,800,030 | 4/1931 | Reynolds | 211/123 |
| 2,222,232 | 11/1940 | McOsker | 223/96 |
| 2,300,797 | 11/1942 | McOsker | 223/96 |
| 2,940,650 | 6/1960 | Hirata | 223/96 |
| 3,412,911 | 11/1968 | Eshelman | 223/95 |
| 3,565,261 | 2/1971 | Recia | 211/119 |
| 3,785,474 | 1/1974 | Nakamoto | 198/678 |

FOREIGN PATENT DOCUMENTS

| | | | |
|---|---|---|---|
| 571143 | 5/1924 | France | 211/113 |
| 1276763 | 10/1961 | France | 211/113 |

Primary Examiner—Louis K. Rimrodt
Assistant Examiner—Joseph S. Machuga
Attorney, Agent, or Firm—McCormick, Paulding & Huber

[57] ABSTRACT

A hanger for holding limp sheet material from a conveyor trolley in a conveyorized garment making plant or the like is fabricated almost entirely of bent wire parts and may be used to hold only one or a group or stack of workpieces. When the hanger arrives at a work station the workpieces may be removed from it, or they can remain on the hanger while they are worked. For the latter case the hanger includes a folding bar useful in separating the already worked pieces from those yet to be worked.

5 Claims, 12 Drawing Figures

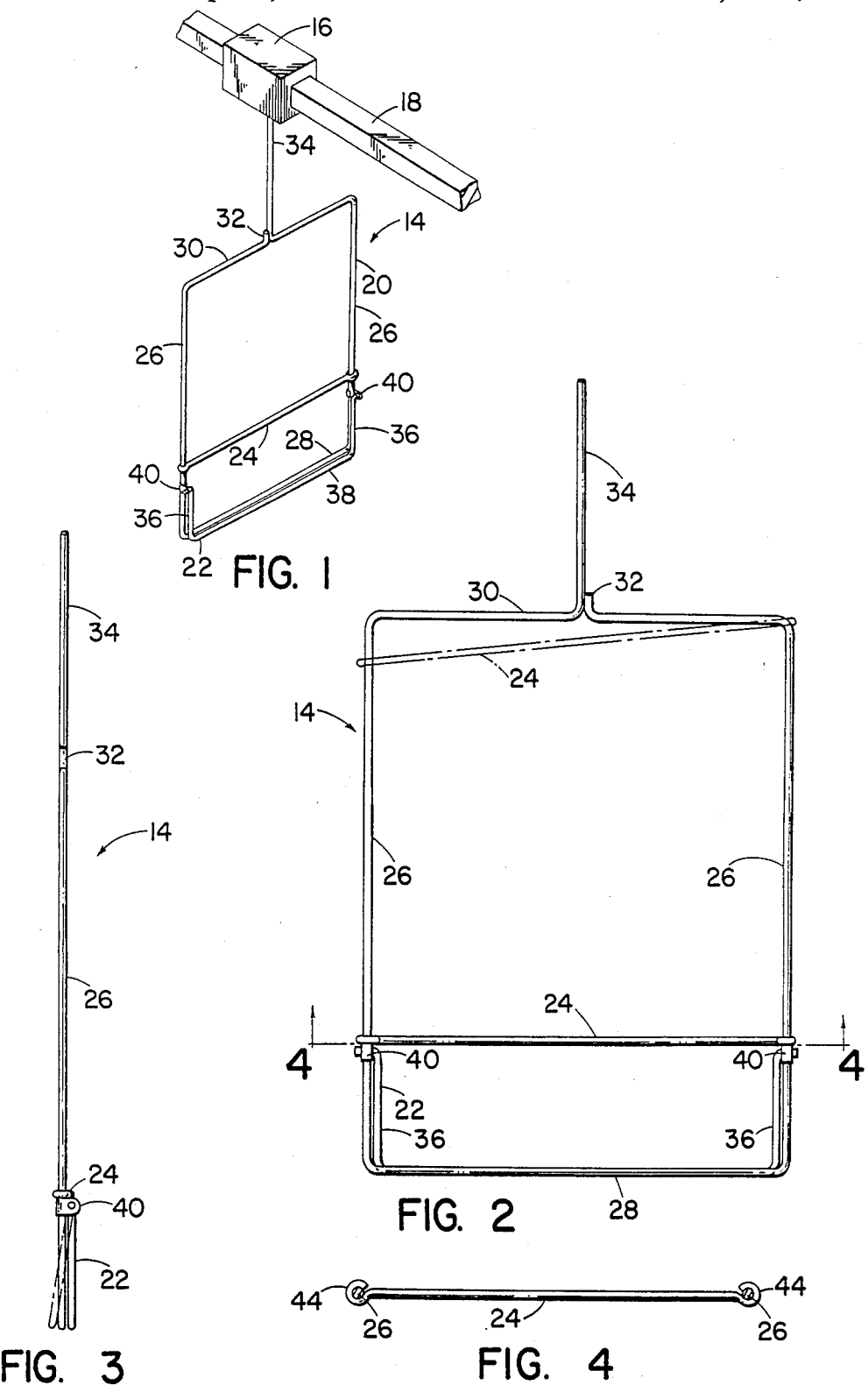

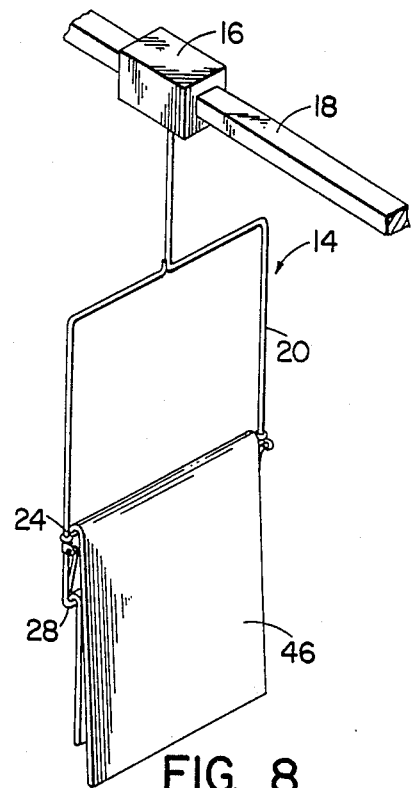
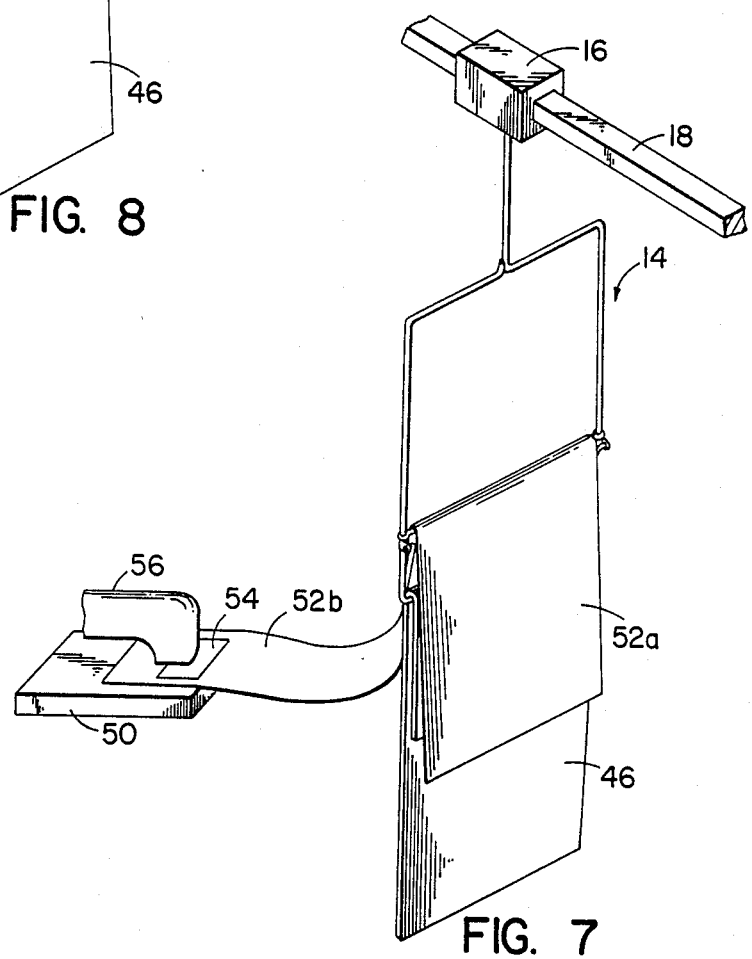
FIG. 8
FIG. 7

CONVEYOR HANGER WITH ROTATING GATE GRIPPER

BACKGROUND OF THE INVENTION

This invention relates to a hanger for holding either an individual piece or a group or stack of pieces of limp sheet material, such as textile garment pieces, and for attachment to a conveyor trolley for moving the pieces from work station to work station in a conveyorized garment making plant or the like, and deals more particularly with an improved construction of such a hanger which facilitates the ability at a work station to work on workpieces transported to the station by the hanger without removing such pieces from the hanger's gripping mechanism and without removing the hanger from the trolley.

In the garment making industry, the upholstery industry and other industries involved in making articles from pieces of fabric or other limp sheet material by performing various operations on such pieces, such as seam sewing, hemming, embroidering, buttonholing, appliquing, etc., at different work stations, it is known to convey pieces of work material in different states of completion, and as individual pieces or stacks or groups of pieces, from work station to work station by a conveyor system including overhead rails and switches, trolleys riding on the rails and hangers hanging from the trolleys, with the hangers having some means for releasably holding the workpieces to the hanger. In some operations performed at a work station, for example the operation of cuffing a trouser leg or attaching a pocket to a shirt front, it may not be necessary for the operator to have access to the whole extent of each workpiece and in such case it is possible that when a group of such workpieces is conveyed to a work station by a hanger that the operator can work on them while they remain held by the hanger and trolley. This has certain obvious advantages such as avoiding the need for the work station operator to unload and reload the workpieces from and to the hanger. Also the hanger can conveniently serve as a storage means for the workpieces while at the work station. That is, if the operator removes a stack of workpieces from a hanger, a place usually has to be provided at the work station for holding those workpieces of the stack yet to be worked on at the work station and those pieces of the stack already worked on at the work station, and considerable manipulations of the operator may be required in moving the workpieces between such places and the work station machine itself. If the hanger is designed in accordance with the present invention many of these movements can be eliminated, reduced or replaced by simpler and/or fewer movements, and the space requirements of the work station can also be reduced.

The general aim of this invention is therefore to provide a hanger for use in a conveyor system of the foregoing character which can be used to reliably hold an individual workpiece or a stack or group of such workpieces and which hanger allows the workpieces to be readily unloaded from and reloaded onto the hanger at the work station if necessary or desired, but which also lends itself to the workpieces remaining on the hanger at the work station while the individual pieces are worked, with the hanger further in such case allowing and facilitating the one workpiece worked on at the time to be separated from the rest of the stack and also allowing and facilitating the already worked workpieces to be separated from the yet to be worked workpieces.

Other objects and advantages of the invention will be apparent from the following description and from the accompanying drawings forming a part thereof.

SUMMARY OF THE INVENTION

The invention resides in a hanger for a conveyorized system for transporting pieces of limp sheet material from work station to work station which hanger may be made almost entirely from bent wire and which is convenient to use both in situations where the transported workpieces are removed from the hanger at a work station and in instances where the workpieces are retained on the hanger, and the hanger on its trolley, while worked at the work station.

More specifically, the invention resides in the hanger including a wire frame having two vertical side bars and a lower horizontal support bar extending therebetween for receiving an individual workpiece or a stack or group of such workpieces folded over the support bar. A U-shaped wire gate has two vertical legs rotatably supported at their upper ends by the two vertical side bars and also has a horizontal gripper bar, extending between said two vertical legs parallel to the support bar, which rests on the bight of the workpieces folded over the support bar to inhibit slipping of the pieces from the support bar. Another horizontal bar is slidably supported at its ends by the two vertical side bars of the frame and can be moved vertically from a stowed position to a lowered active position at which it serves as a folding bar for separating yet to be worked pieces from already worked pieces of the group or stack of pieces held by the hanger.

BRIEF DESCRIPTION OF THE DRAWINGS

FIG. 1 is a perspective view of an empty hanger embodying this invention attached to a trolley of a conveyor system.

FIG. 2 is a front elevational view of the hanger of FIG. 1.

FIG. 3 is a side elevational view of the hanger of FIG. 1.

FIG. 4 is a horizontal sectional view taken on the line 4—4 of FIG. 2.

FIG. 7 is a view similar to FIG. 6 but shows the second workpiece of the stack being worked on at the work station.

FIG. 8 is a view similar to FIG. 5 but shows the condition of the stack of workpieces after they have all been worked on at the work station of FIGS. 6 and 7.

DETAILED DESCRIPTION OF THE PREFERRED EMBODIMENT

Figure 5:
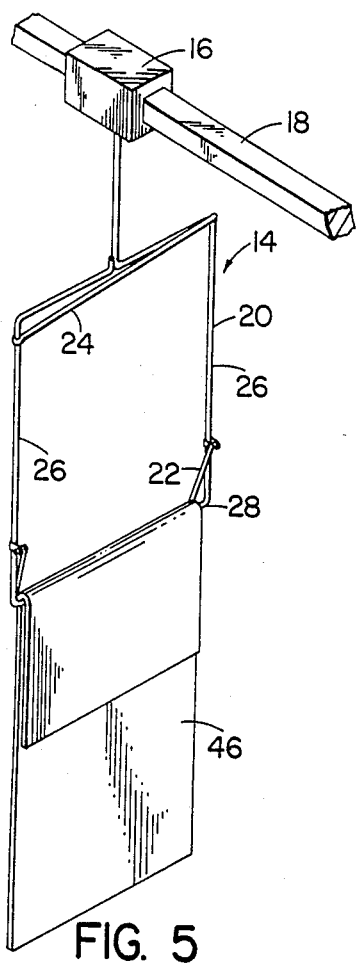
FIG. 5 is a perspective view similar to FIG. 1 but showing the hanger supporting a stack of workpieces.

Referring to FIGS. 1 to 4, a hanger embodying the invention is illustrated at 14 and is connected to a trolley 16 riding on a rail 18, all of which may form a part of a conveyor system for transporting limp sheet material from work station to work station in a garment making plant or the like. The trolley 12 and track 14 may take any one of various well-known forms and, as is also well known, the track 18 usually has associated with it a moving chain or other powered element for moving the trolley 16 along the track, and switches are generally included in the system for directing the trolleys and hangers to various desired points in the plant. When a trolley and associated hanger 14 reach a work station the trolley is generally separated or separable from the driving chain or the like so that the trolley and hanger can remain stationary relative to the work station while the operator loads and/or unloads material onto or from the hanger or while the operator works on workpieces while they remain suspended from the hanger.

The material hung from the hanger 14 of FIG. 1 may consist of either a single workpiece or a group or stack of such workpieces, and each workpiece may be in any given state of completion. That is, each workpiece for example may be a single cut unworked pattern piece, a single pattern piece already worked with embroidery, buttonholing, hemming or the like, or a number of sewn together pattern pieces further worked with embroidery, smocking, appliquing, etc. In the following discussion, including the claims, a quantity of work material held or to be held by the hanger 14 will sometimes be referred to as a "unit" of work material with it being understood that such "unit" may consist of either a single workpiece or a number of workpieces superimposed to form a somewhat loose group or a more neatly layered stack.

As to its construction, the hanger 14 is made principally of a number of parts formed of wire. As an example, this wire may be round cold rolled steel rod of one-quarter inch diameter which is preferably bright chrome-plated in the finished hanger. The wire parts consist of a frame 20, a generally U-shaped gate 22, and a folding bar 24. The frame 20 has a rectangular body comprised of two vertical side bars 26, 26, a horizontal bottom or support bar 28 extending between the lower ends of the side bars 26, 26 and a top bar 30 made in two halves and joined by welding at 32. A hanger rod portion 34 of the frame extends upwardly from the top bar 30 for connecting the hanger to the trolley 16. The size of the frame 20 may be varied to suit requirements, but in a typical case the side bars 26, 26 may be about twenty inches long and the lower support bar 28 about fifteen inches long.

The gate 22 cooperates with the support bar 28 to aid in holding in place material folded over the support bar. It consists of two normally substantially vertical side legs 36, 36 and a horizontal gripper bar 38 extending between the lower ends of the two legs 36, 36. At their upper ends the two legs 36, 36 are each bent outwardly and rotatably received in a respective one of two lugs 40, 40, each welded to an associated one of the frame side bars 26, 26. As seen best in FIGS. 2 and 3, the vertical position of the lugs 40, 40 on the side bars 26, 26 is such that in the empty hanger the gripper bar 38 is positioned at about the same height as the support bar 28. Further, the two side bars 36, 36 of the gate are positioned slightly inboard of their associated frame side bars 26, 26. Therefore the gate 22 is rotatable only slightly less than 360 degrees from the position illustrated in FIG. 3 by the full lines counterclockwise to the position shown by the broken lines, but a full 360 degree revolution of the gate is prohibited by interference of the gripper bar with the support bar. In essence, this substantially full revolution of the gate relative to the frame allows the gripper bar 38 to be placed on one side or the other of the support bar, as seen in FIG. 3, to best suit the way in which workpieces are folded over the support bar 28 as explained in more detail hereinafter.

The folding bar 24 extends horizontally between the two side bars 26, 26 of the frame 20 and is slidably supported on such side bars for vertical movement by having each of its ends bent into an eye 44 slidably capturing the associated side bar 26, as seen in FIG. 4. When the folding bar 24 is not needed it may be moved upwardly to a stowed position indicated by the broken lines of FIG. 2, at which one of the eyes 44, 44 is moved over one of the upper corners of the frame, and it will retain this position until manually removed from it. From the stowed position the folding bar is movable downwardly to an active position shown by the solid lines of FIG. 2 at which it is vertically supported by engagement of the eyes 44, 44 with the lugs 40, 40.

The remaining figures, namely FIGS. 5 to 12, illustrate the use of the hanger 14 of the invention. FIG. 5, for example, shows the hanger 14 with a unit 46 of work material folded over the support bar 28, and it is further held in the illustrated position by the gate 22, the gripper bar 38 of which rests on the bight 48 of the work unit to clamp it between itself and the support bar 28. In this figure the folding bar 24 is shown in its stowed position and if the work unit 46 is to be removed from the hanger at the next work station the folding bar 24 may be retained in this stowed position.

Figure 6:
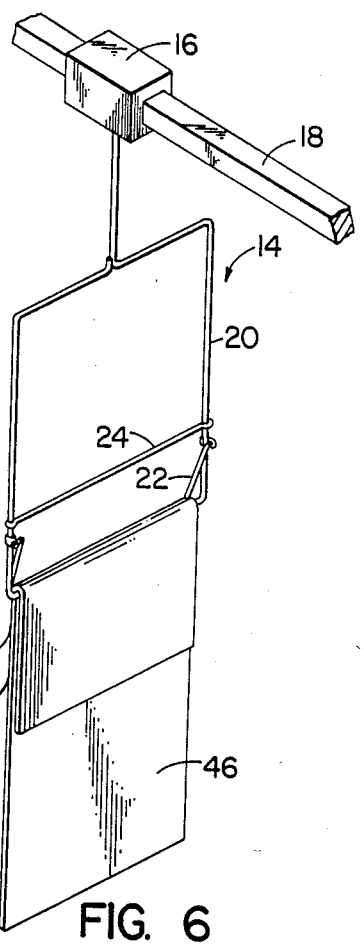
FIG. 6 is a view similar to FIG. 5 but showing the hanger positioned at a work station with the first one of the pieces of the stack being worked on at that station.
Figures 9, 10:
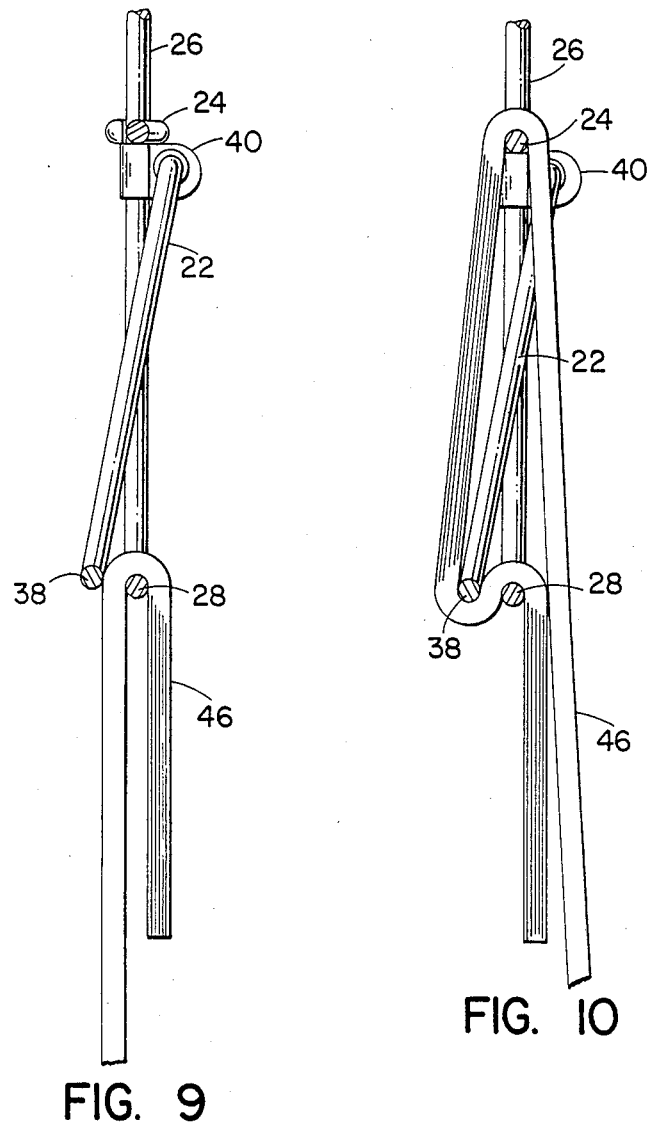
FIG. 9 is a vertical sectional view taken generally on the line 9—9 of FIG. 5.
FIG. 10 is a view similar to FIG. 9 but showing the condition of the stack of workpieces after all of them have been folded over the folding bar.

FIG. 6 shows the hanger 14 and work unit 46 of FIG. 5 now positioned at a work station 50 and it is now assumed that the work unit 46 consists of a stack of workpieces and that each of these workpieces is to be worked on individually at the work station 50 while the work unit remains on the hanger 14 and the hanger 14 on the trolley 16. One individual workpiece of the stack is indicated at 52a and it, for example, may be taken that at the work station 50 a pocket 54 is to be sewn onto such workpiece by a sewing machine 56. The illustrated workpiece 52a is the first one of the unit 46 worked on at the work station 50 and the folding bar 24 has now been moved downwardly to its active position in readiness for receiving the illustrated workpiece 52a after the work station 50 is finished with it.

FIG. 7 is similar to FIG. 6 except that in this case the work station 50 is now shown working on the second workpiece 52b of the work unit 46. The previously worked workpiece 52a has now been folded over the folding bar 24 and is thus out of the way of both the workpiece 52b being worked at the time and the remaining workpieces of the unit 46 still to be worked. It will therefore be evident that by folding each workpiece over the folding bar 24 as it is finished at the work station 50 a convenient separation of the already worked workpieces from the yet to be worked workpieces of the stack or group of workpieces held by the hanger is made without having to provide any storage area or space at the work station for holding such pieces.

After all of the workpieces of the unit 46 carried by the hanger 14 have been worked on at the work station the hanger and the work unit 46 carried by it will have the appearance as shown in FIG. 8 at which all of the workpieces of the unit 46 are now folded over the folding bar 24. The hanger 14 and the work unit 46 may now be transferred by the trolley 16 to a following work station in this condition or, if desired, the work unit may first be folded back to the condition of FIG. 5.

As mentioned previously, the ability of the gate 22 to rotate almost a full 360 degrees relative to the frame 20 allows the gripper bar to be placed on whichever side of the support bar best suits the way in which the work unit is hung from the support bar. This is explained further in connection with FIGS. 9 through 12. Basically, the gripper bar 38 functions best in aiding to hold a work unit 46 to the support bar 28 if it is positioned on the same side of the support bar 28 as the heavier (usually longer) side of the work unit. Thus, in FIG. 9 the heavier side of the work unit 46 is located on the left side of the support bar 28 and accordingly the gate 22 is positioned angularly to cause the gripper bar 38 to engage the left side of the work unit. If the workpieces of the work unit 46 are all folded over the folding bar 24 from the FIG. 9 position the end result will be the condition of FIG. 10.

Figures 11, 12:
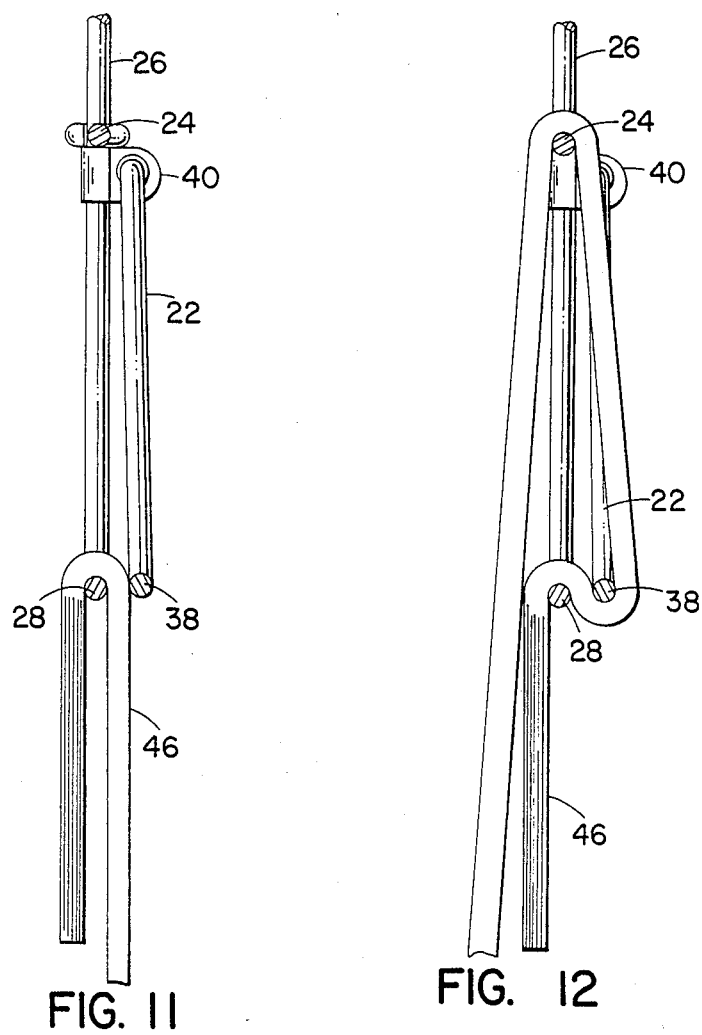
FIG. 11 is a view similar to FIG. 9 but shows an alternate way in which the stack of workpieces may be loaded onto the hanger.
FIG. 12 is a view similar to FIG. 11 but shows the condition of a stack after all of the workpieces have been folded over the folding bar.

In FIG. 11 the heavier and longer side of the work unit 46 is located on the right side of the support bar 28 and therefore this time the gate 22 is placed in the angular position at which its gripping bar 38 engages the right side of the work unit. Again, if all of the pieces of the work unit are folded over the folding bar 24 from the FIG. 11 condition the result will be the condition of FIG. 12.

We claim:

1. A hanger for use in a conveyorized system for transporting limp material from work station to work station, said hanger comprising a frame having two vertical side bars and a first horizontal bar extending between the lower ends of said side bars, a U-shaped gate having two normally generally vertical legs rotatably supported at their upper ends by said two vertical side bars and also having a second horizontal bar extending between the lower ends of said two vertical legs parallel to said first bar, said gate having at least one position relative to said frame toward which it is biased by gravity, said second bar when said gate is in said at least one position relative to said frame being positioned alongside said first bar, a folding bar extending generally horizontally between said two vertical side bars and having two ends each slidably connected with the adjacent one of said vertical side bars to support said folding bar for sliding vertical movement relative to said frame, two stops each fixed on a respective one of said two vertical side bars, said stops being located below said folding bar and being engageable with said folding bar to limit its downward movement relative to said frame to a lower position at which said folding bar is spaced above said first bar, said folding bar being movable upwardly relative to said frame from said lower position to an upper position at which is is spaced a greater distance from said first bar, means for releasably holding said folding bar in said upper position, said folding bar when released from said upper position being urged by gravity toward said lower position, and means for connecting said frame to a conveyor trolley.

2. A hanger as defined in claim 1 further characterized by said vertical side bars and said first bar being made of wire and said U-shaped gate also being made of wire, said stops being two lugs fixed to said two vertical side bars at a uniform spacing upwardly from said first bar, said vertical legs of said U-shaped gate having their upper ends bent to provide short outwardly extending horizontal end portions, and each of said lugs having an aperture rotatably receiving a respective one of said horizontal end portions of said gate to support said gate for rotation relative to said frame.

3. A hanger as defined in claim 10 further characterized by each of said vertical legs of said gate being located slightly inboard of its associated one of said frame side bars so that said gate is rotatable almost a full revolution relative to said frame to allow said second bar to be selectively placed on one side or the other of said support bar.

4. A hanger as defined in claim 10 further characterized by said folding bar also being made of wire, and said folding bar having each of its said two ends slidably connected with the adjacent one of said vertical side bars by said end being formed into an eye slidably capturing the adjacent one of said vertical side bars.

5. A hanger as defined in claim 12 further characterized by said frame and said eyes of said folding bar cooperatively providing said mean for holding said folding bar in said upper position by said frame being generally rectangular in shape with an upper corner at the upper end of each of said vertical side bars, and said eyes at the opposite ends of said folding bar being of such size that as said folding bar is moved toward said upper position one of said eyes may be moved over one of said upper corners of said frame to releasably hold said folding bar in said upper position.

* * * * *